US007700926B2

(12) United States Patent
Tartaglia et al.

(10) Patent No.: US 7,700,926 B2
(45) Date of Patent: Apr. 20, 2010

(54) SYSTEMS AND METHODS FOR RADIOISOTOPE GENERATION

(75) Inventors: Daniel Tartaglia, St-Leonard (CA); Carlo Coppola, Pointe-Claire (CA); Vince Teoli, Montreal (CA); Alain Guy Bournival, St-Lazarre (CA)

(73) Assignee: Draximage General Partnership (CA)

( * ) Notice: Subject to any disclaimer, the term of this patent is extended or adjusted under 35 U.S.C. 154(b) by 0 days.

(21) Appl. No.: 11/773,022

(22) Filed: Jul. 3, 2007

(65) Prior Publication Data

US 2008/0093564 A1    Apr. 24, 2008

Related U.S. Application Data

(63) Continuation-in-part of application No. 11/610,574, filed on Dec. 14, 2006.

(60) Provisional application No. 60/758,419, filed on Jan. 12, 2006.

(51) Int. Cl.
*G21G 1/04* (2006.01)
*G21F 5/015* (2006.01)

(52) U.S. Cl. .............................. 250/432 PD; 422/159; 423/249

(58) Field of Classification Search ........... 250/432 PD; 422/159; 423/249
See application file for complete search history.

(56) References Cited

U.S. PATENT DOCUMENTS

| 3,576,998 | A | * | 5/1971 | Deutsch et al. | ....... 250/432 PD |
| 3,655,981 | A | | 4/1972 | Montgomery et al. | .... 250/106 T |
| 3,749,556 | A | * | 7/1973 | Barak et al. | ........... 250/432 PD |
| 3,774,035 | A | | 11/1973 | Litt | ............................. 250/430 |
| 3,882,315 | A | | 5/1975 | Soldan | ........................ 250/506 |
| 3,920,995 | A | * | 11/1975 | Czaplinski et al. | .... 250/432 PD |
| 3,946,238 | A | * | 3/1976 | Fries | .................... 250/432 PD |
| 4,020,351 | A | | 4/1977 | Gemmill, Sr. et al. | . 250/432 PD |
| 4,039,835 | A | | 8/1977 | Colombetti | ................. 250/432 |
| 4,084,097 | A | | 4/1978 | Czaplinski et al. | .......... 250/506 |
| 4,144,461 | A | | 3/1979 | Glasser et al. | .............. 250/506 |
| 4,160,910 | A | * | 7/1979 | Thornton et al. | ...... 250/432 PD |
| 4,280,053 | A | | 7/1981 | Evans et al. | |

(Continued)

FOREIGN PATENT DOCUMENTS

CA    1093223    1/1981

(Continued)

OTHER PUBLICATIONS

Schwochau, Klaus. *Technetium*, Wiley-VCH (2000) (ISBN 3-527-29496-1) (http://www.answers.com/topic/radiopharmacology) 7 pages.

(Continued)

*Primary Examiner*—Jack I Berman
(74) *Attorney, Agent, or Firm*—Woodcock Washburn LLP

(57) ABSTRACT

Systems and methods are disclosed for producing customized, predictable and reproducible supplies of radioisotopes using, for example, a reactor housing that is fabricated from a radioactive shielding material and has both an internal volume and a surface that comprises an entry port and an exit port, a chromatographic column that is positioned within said internal volume such that a first end of said column is in fluid communication with said entry port and a second end of said column is in fluid communication with said exit port, and a changeable filter module that is disposed external to said reactor housing and in fluid communication with said exit port.

60 Claims, 7 Drawing Sheets

U.S. PATENT DOCUMENTS

| | | | |
|---|---|---|---|
| 4,286,169 A | 8/1981 | Rossem | |
| 4,387,303 A | 6/1983 | Benjamins | 250/432 PD |
| 4,414,145 A * | 11/1983 | Panek | 250/432 PD |
| 4,782,231 A | 11/1988 | Svoboda et al. | 250/432 PD |
| 5,109,160 A * | 4/1992 | Evers | 250/432 PD |
| 5,186,913 A | 2/1993 | Knapp, Jr. et al. | |
| 5,397,902 A | 3/1995 | Castner et al. | 250/432 PD |
| 5,831,271 A | 11/1998 | Okano et al. | 250/432 PD |
| 5,834,788 A | 11/1998 | Fu et al. | 250/506.1 |
| 6,157,036 A | 12/2000 | Whiting et al. | 250/432 PD |
| 6,781,142 B2 | 8/2004 | Hutcheson | 250/506.1 |
| 6,998,052 B2 | 2/2006 | Horowitz et al. | 210/638 |
| 7,060,998 B2 | 6/2006 | Forrest et al. | 250/506.1 |
| 7,091,494 B2 | 8/2006 | Weisner et al. | 250/432 PD |
| 7,163,031 B2 | 1/2007 | Graves et al. | 141/9 |
| 2003/0219366 A1 | 11/2003 | Horwitz et al. | |
| 2005/0104016 A1 | 5/2005 | Forrest et al. | 250/506.1 |
| 2005/0116186 A1 | 6/2005 | Weisner et al. | 250/505.1 |
| 2005/0253085 A1 | 11/2005 | Weisner et al. | 250/430 PD |
| 2006/0023829 A1 | 2/2006 | Schenter et al. | 376/190 |

FOREIGN PATENT DOCUMENTS

| | | |
|---|---|---|
| WO | 2006/039787 A1 | 4/2006 |
| WO | 2006/124775 A2 | 11/2006 |
| WO | 2007/016174 A2 | 2/2007 |
| WO | 2007/030249 A2 | 3/2007 |
| WO | 2007/041017 A1 | 4/2007 |

OTHER PUBLICATIONS

Brookhaven National Laboratory site on the history of the technetium cow. "The Technetium-99m Generator," Retrieved online at (http://www.bnl.gov/bnlweb/history/Tc-99m.asp), 2 pages.

* cited by examiner

SYSTEMS AND METHODS FOR RADIOISOTOPE GENERATION

CROSS REFERENCE TO RELATED APPLICATION

The present application is a continuation-in-part application and claims priority to U.S. application Ser. No. 11/610,574, filed Dec. 14, 2006, which is hereby incorporated by reference. U.S. application Ser. No. 11/610,574 claims priority to U.S. Provisional Patent Application No. 60/758,419, filed Jan. 12, 2006, which is also hereby incorporated by reference.

FIELD OF THE INVENTION

This invention relates generally to systems and methods for radioisotope generation. In one aspect, this invention relates to systems and methods for producing customized, predictable and reproducible supplies of radioisotopes for use in nuclear medicine.

BACKGROUND OF THE INVENTION

Nuclear medicine is a branch of medicine dealing with the use of radioisotopes as radiopharmaceuticals or radioactive tracers in the diagnosis and treatment of disease. Radioisotopes are natural or artificially created isotopes (isotopes being one of two or more atoms having the same atomic number but different mass numbers) of a chemical element that have an unstable nucleus that decays, emitting alpha, beta, or gamma rays until stability is reached.

Radioisotopes, such as the meta stable Technetium-99m (Tc-99m), are used in medical tests as radioactive tracers that medical equipment can detect in the body. Other generator-derived radioisotopes that are used as tracers include yttrium-90, rhenium-188, and gallium-68. Tc-99m, in particular, emits readily detectable gamma rays, and it has a half-life of 6 hours. A variety of different radiopharmaceuticals based on Tc-99m are used for imaging and functional studies of the brain, myocardium, thyroid, lungs, liver, gallbladder, kidneys, skeleton, blood and tumors. Schwochau, Klaus. *Technetium*, Wiley-VCH (2000) (ISBN 3-527-29496-1). Scientists continue to find new uses for radioisotopes, such as Tc-99m. For example, doctors recently used Tc-99m to diagnose precisely the infected lymph nodes in breast cancer patients by injecting Tc-99m into the breast around the tumor to allow them to locate the node quickly and precisely before ever making an incision. *Brookhaven National Laboratory site on the history of the technetium cow.* (http://www.bnl.gov/bnlweb/history/Tc-99m.asp).

A Tc-99m generator, often called a technetium cow, is a device used to extract Tc-99m from decaying molybdenum-99 ("Mo-99"). Mo-99 has a half-life of 66 hours and can be transported over long distances to radiopharmacies and hospitals where its decay product Tc-99m is used for nuclear medicine diagnostic procedures. Removing the Tc-99m from the generator ("milking" the generator) is typically done every 6 hours or, at most, twice daily. Most commercial generators use column chromatography, in which Mo-99 is adsorbed onto alumina. Normal saline solution can be run through a column of immobilized Mo-99 to elute soluble Tc-99m, resulting in a saline solution containing the Tc-99m.

Today, commercial radiopharmacies typically replace their generators on a bi-weekly basis, since the useful life of a Tc-99m generator is about 6 half lifes or approximately two weeks. Hence, typical clinical nuclear medicine units purchase at least one such generator every two weeks or order several in a staggered fashion. The lead-lined generators are heavy and bulky and represent significant manipulation and toil for personnel to replace and to dispose of spent generators. Large quantities of lead, molded plastic containers, and packing materials are used only once and discarded after two weeks. Shipping costs and waste are real considerations for end-users. Further, conventional generator systems lack flexibility as they are limited to fixed activity denominations per unit sold, resulting in limited predictability and reproducibility. Typical generators also do not provide activity above 19 Ci.

It would be desirable therefore to provide systems and methods for producing customized, predictable and reproducible supplies of radioisotopes, including high activity levels, that do not require weekly replacement, handling and transport of heavy shielding materials associated with conventional generators.

SUMMARY OF THE INVENTION

In one aspect, the present invention provides systems comprising a reactor housing that is fabricated from a radioactive shielding material and has both an internal volume and a surface that comprises an entry port and an exit port; a chromatographic column that bears at least one radioisotope and is positioned within said internal volume such that a first end of said column is in fluid communication with said entry port and a second end of said column is in fluid communication with said exit port; and a filter module that is disposed external to said reactor housing and in fluid communication with said exit port.

In another aspect, the present invention provides kits comprising a column that bears at least one radioisotope, delivery housing, and a filter module comprising a radioactive shielding material insert.

The present invention also provides methods comprising the steps of providing a system that comprises a reactor housing that is fabricated from a radioactive shielding material and has both an internal volume and a surface that comprises an entry port and an exit port; a first chromatographic column that bears at least one radioisotope and that is positioned within said internal volume such that a first end of said column is in fluid communication with said entry port and a second end of said column is in fluid communication with said exit port; and a first filter module that is disposed external to said reactor housing and in fluid communication with said exit port; and either: positioning a first delivery vessel comprising a saline solution external to said reactor housing and in fluid communication with said entry port for a time and under conditions effective to elute said chromatographic column with at least a portion of said solution; or positioning a collection vessel external to said reactor housing and in fluid communication with said exit port via said filter module; or removing said first chromatographic column from said reactor housing; or removing said first filter module.

In yet another aspect, the present invention provides methods comprising the steps of: receiving customer information including a target output of a radioisotope; and adding a solution of a parent radioisotope to a column in an amount sufficient to produce said target output upon decay of said parent radioisotope.

In still another aspect, the present invention provides methods comprising the steps of: providing a system that comprises: a reactor housing that is fabricated from a radioactive shielding material and has both an internal volume and a surface that comprises an entry port and an exit port; and a first chromatographic column that bears at least one radioisotope and that is positioned within said internal volume; positioning a first delivery vessel comprising a solution of saline external to said reactor housing and in fluid communication with said entry port for a time and under conditions effective to elute said second chromatographic column with at least a portion of said saline solution.

In still another aspect, the present invention provides methods comprising the steps of: providing a system that comprises: a reactor housing that is fabricated from a radioactive shielding material and has both an internal volume and a surface that comprises an entry port and an exit port; and a first chromatographic column that bears at least one radioisotope and that is positioned within said internal volume; removing said first chromatographic column from said internal volume; positioning a second chromatographic column within said internal volume such that a first end of said column is in fluid communication with said entry port and a second end of said column is in fluid communication with said exit port; positioning a first delivery vessel comprising a saline solution external to said reactor housing and in fluid communication with said entry port for a time and under conditions effective to elute said second chromatographic column with at least a portion of said solution.

In another aspect, the present invention provides methods comprising: shipping a system comprising: a reactor housing that is fabricated from a radioactive shielding material and has both an internal volume and a surface that comprises an entry port and an exit port; a chromatographic column that bears at least one radioisotope and that is positioned within said internal volume such that a first end of said column is in fluid communication with said entry port and a second end of said column is in fluid communication with said exit port.

In still another aspect, the present invention provides systems comprising: a reactor housing that is fabricated from a radioactive shielding material and has both an internal volume and a surface that comprises an entry port and an exit port; a pre-loaded hot chromatographic column that is positioned within said internal volume such that a first end of said column is in fluid communication with said entry port and a second end of said column is in fluid communication with said exit port; and a filter module that is disposed external to said reactor housing and in fluid communication with said exit port.

DETAILED DESCRIPTION OF ILLUSTRATIVE EMBODIMENTS

Figure 1:
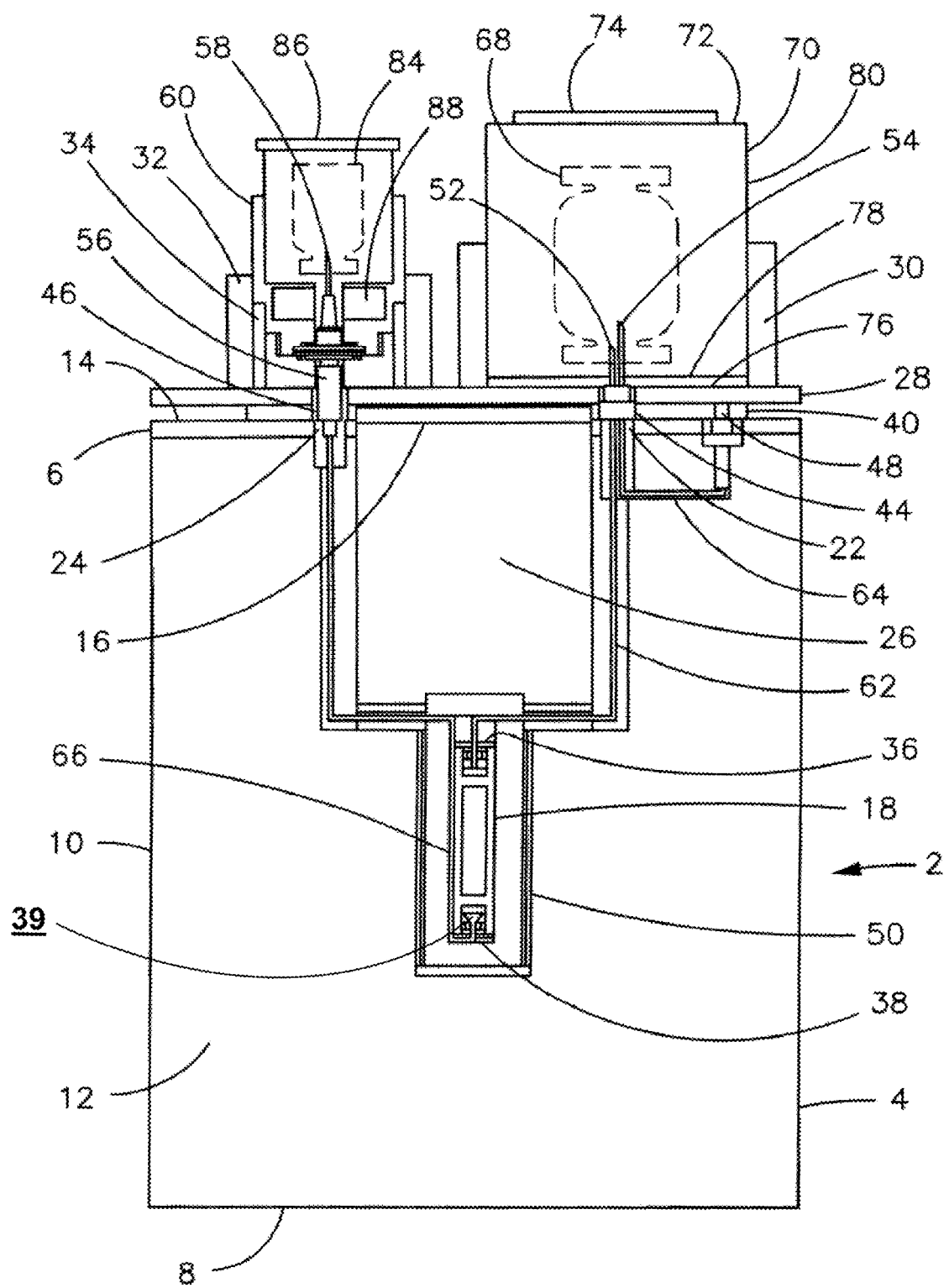
FIG. 1 is a cutaway side view depicting one generator system according to the invention.

With reference to the drawings, FIG. 1 shows one type of generator system 2 according to the invention. The generator system may include a reactor housing 4 fabricated from a radioactive shielding material such as lead, tungsten, or depleted uranium. The reactor housing 4 may be substantially cylindrical, as shown in FIG. 1. In another embodiment, the reactor housing may be substantially rectilinear. The reactor housing 4 may include a first end 6, a second end 8, and a wall 10 extending between said first end 6 and said second end 8. The reactor housing 4 may have both an internal volume 12 and a surface 14 that comprises an opening 16 for inserting a column 18 (said column may be included in a column assembly 20, shown in more detail in FIG. 5), an entry port 22, and an exit port 24. The opening 16, entry port 22 and exit port 24 may be positioned at said first end 6 of said housing 4. A radioactive shielding plug 26 may be disposed in said opening 16 in said surface 14 above said column 18. The radioactive shielding plug 26 may be fabricated from a radioactive shield material such as lead, tungsten, or depleted uranium. The reactor housing 4 may have an adapter disk 28 disposed on the surface 14 of said reactor housing 4 that comprises a ridge of guide material 30 that may extend around said entry port 22 and a ridge of guide material 32 that may extend around said exit port 24. Preferably, the adapter disk 28 and ridges of guide material 30 and 32 are plastic. A ridge of radioactive shielding material 34 may extend around said exit port 24.

A chromatographic column 18 may be positioned within said internal volume 12 such that a first end 36 of said column 18 is in fluid communication with said entry port 22 and a second end 38 of said column 18 is in fluid communication with said exit port 24. In one embodiment, the column 18 may be included in a column assembly 20. The column assembly 20, in turn, may comprise a column adaptor plate 40 having a radioactive shielding plug opening 42, an adaptor plate entry port 44 and an adaptor plate exit port 46 corresponding to said entry port 22 and said exit port 24 of said reactor housing, respectively, an adaptor plate vent port 48 (which may include a vent filter), and a column housing 50, preferably fabricated from radioactive shielding material such as lead, tungsten, or depleted uranium. The column assembly 20 may comprise an entry needle 52 and a vent needle 54 disposed in said adaptor plate entry port 44, and an exit connection 56, adapted for fluid communication with a changeable sterile needle 58 of a filter module 60. An entry pipe 62 may extend from said entry needle 52 to said first end 36 of said column 18. A vent pipe 64 may extend from said vent needle 54 to a safety valve 55 (said safety valve 55 protecting said vent filter by preventing back pressure from being released onto said vent filter) and said safety valve 55 may extend to said vent port 48. An exit pipe 66 may extend from said second end 38 of said column 18 to said exit connection 56. The column 18 may be inserted into said internal volume 12 of said reactor housing 4 through said opening 16 in said surface 14 of said reactor housing 4. Alternatively, said column assembly 20 may be positioned such that said column 18 is disposed in said internal volume 12 of said reactor housing 4. The column 18 may comprise at least one radioisotope, including but not limited to Mo-99, Tc-99m, Y-90, Re-188, or Ga-68. In preferred embodiments, the column 18 is fabricated from glass. The column 18 may contain alumina in the form of aluminum oxide, $Al_2O_3$ (mp of about 2,000° C. and specific gravity of about 4.0). Preferably, the column 18 is a glass column that contains aluminum oxide. The aluminum oxide powder preferably has a particle size of from about 20 to about 200 µm. In addition to the aluminum oxide powder, the column 18 may also include silica gel having a particle size of from about 20 to about 100 µm. The column 18 may also comprise one or more layers or polypropylene filter membranes, deactivated fused silica wool, and/or one or more glass filter membranes. The filter membranes preferably measure from about 0.2 to about 10 µm and may comprise polyether sulfone, Acetal plastic plugs or silicone plugs as funnel drains 39 and/or stainless steel tubing with needle and filter adaptors. Particularly preferred filter membranes are those fabricated from polyether sulfone at a size of 0.2 µm.

Figure 4:
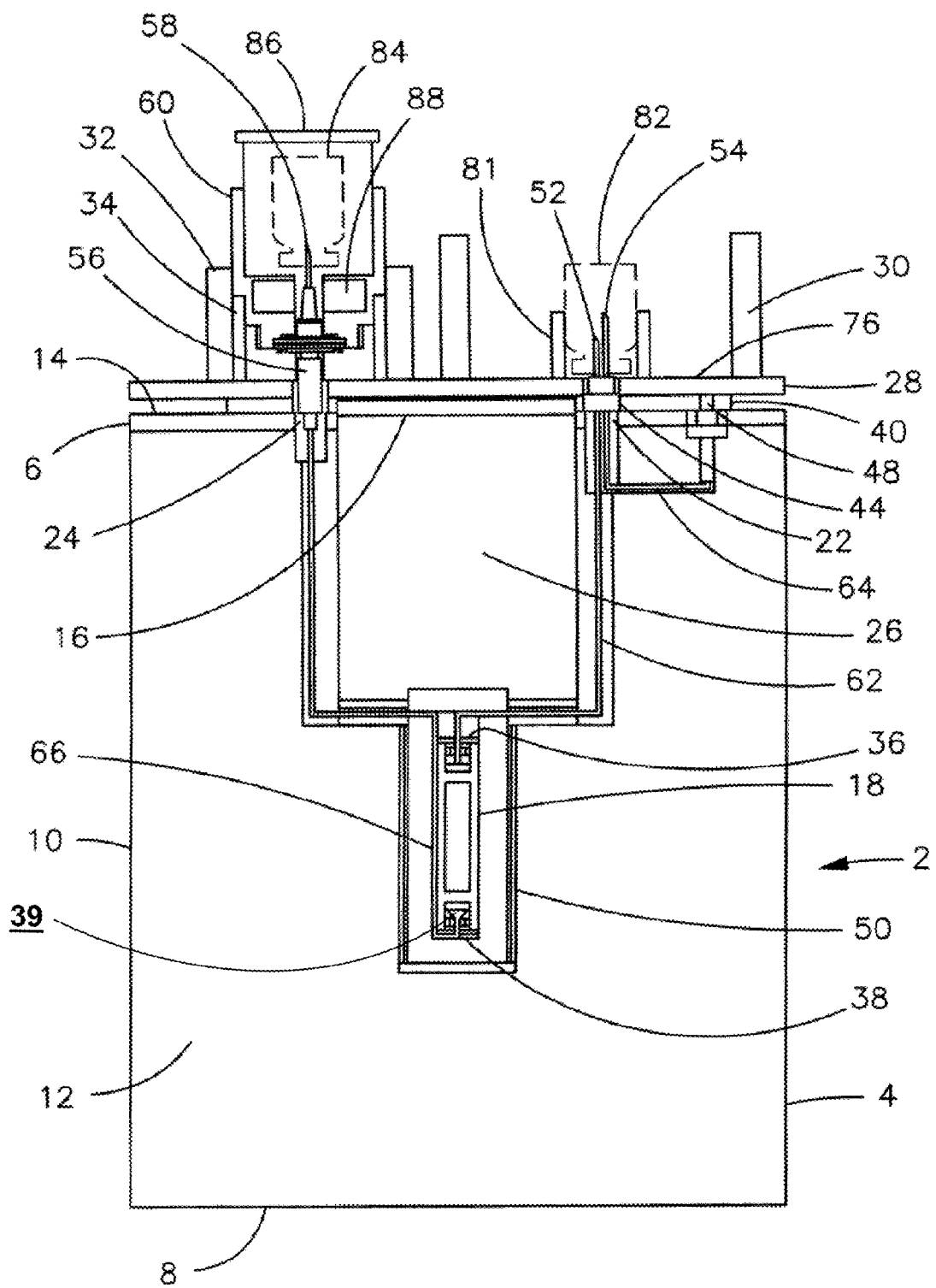
FIG. 4 is a cutaway side view of one generator system according to the invention.

A delivery vessel 68 may be disposed external to said reactor housing 4 and in fluid communication with said entry port 22. The delivery vessel 68 may be a 3 to 20 ml (preferably 10 ml) borosilicate glass vessel. The delivery vessel 68 may be contained within a delivery housing 70 that is fabricated from radioactive shielding material such as lead, tungsten, or depleted uranium. The delivery housing 70 preferably is fabricated from radioactive shielding material and has a first end 72 that includes a first coupling 74, a second end 76 that includes a second coupling 78, and a wall 80 extending between said first end 72 and said second end 76. The first coupling 74 and second coupling 78 may be threaded or may form a lure lock. In certain embodiments, delivery vessel 68 comprises a solution of at least one radioisotope, including but not limited Mo-99 or Tc-99m in the form of sodium molybdate Mo-99 or sodium pertechnetate Tc-99m, respectively. In such embodiments, delivery vessel 68 preferably comprises from about 1 to about 50 Ci (1 curie (Ci) is 37 gigabecquerels (GBq) exactly and 1 Bq=$2.7027 \times 10^{-11}$ Ci). In other embodiments, delivery vessel 68 comprises Normal Saline [0.9%] solution. The delivery housing 70 may abut a ridge of guide material 30 that may be external to said reactor housing 4 and may extend around said entry port 22. The delivery housing 70 may be at least partially contained within a ridge of guide material 30 that may be external to said reactor housing and may extend around said entry port 22. In certain embodiments, an adapter guide ridge 81 may be disposed on said adapter disk 28 circumferentially internal to said ridge of guide material 30. A saline vessel 82 may be disposed external to said reactor housing 4, and in fluid communication with said entry port 22 and may abut said adapter guide ridge 81 (FIG. 4) that extends around said entry port 22. The saline vessel 82 may comprise Normal Saline [0.9%] solution.

The generator system 2 may comprise a collection vessel 84 that is disposed external to said reactor housing 4 and in fluid communication with said exit port 24 via a filter module 60, discussed below with reference to FIG. 2. The collection vessel 84 may be evacuated, and ultimately is used to collect a solution of at least one radioisotope. The collection vessel 84 may be a 10 to 30 ml borosilicate glass vessel. Preferably, the collection vessel 84 is a 20 to 30 ml sterile, evacuated, borosilicate glass vessel. As shown in FIG. 1, collection vessel 84 is contained within a collection housing 86 that is fabricated from radioactive shielding material.

Figure 2:
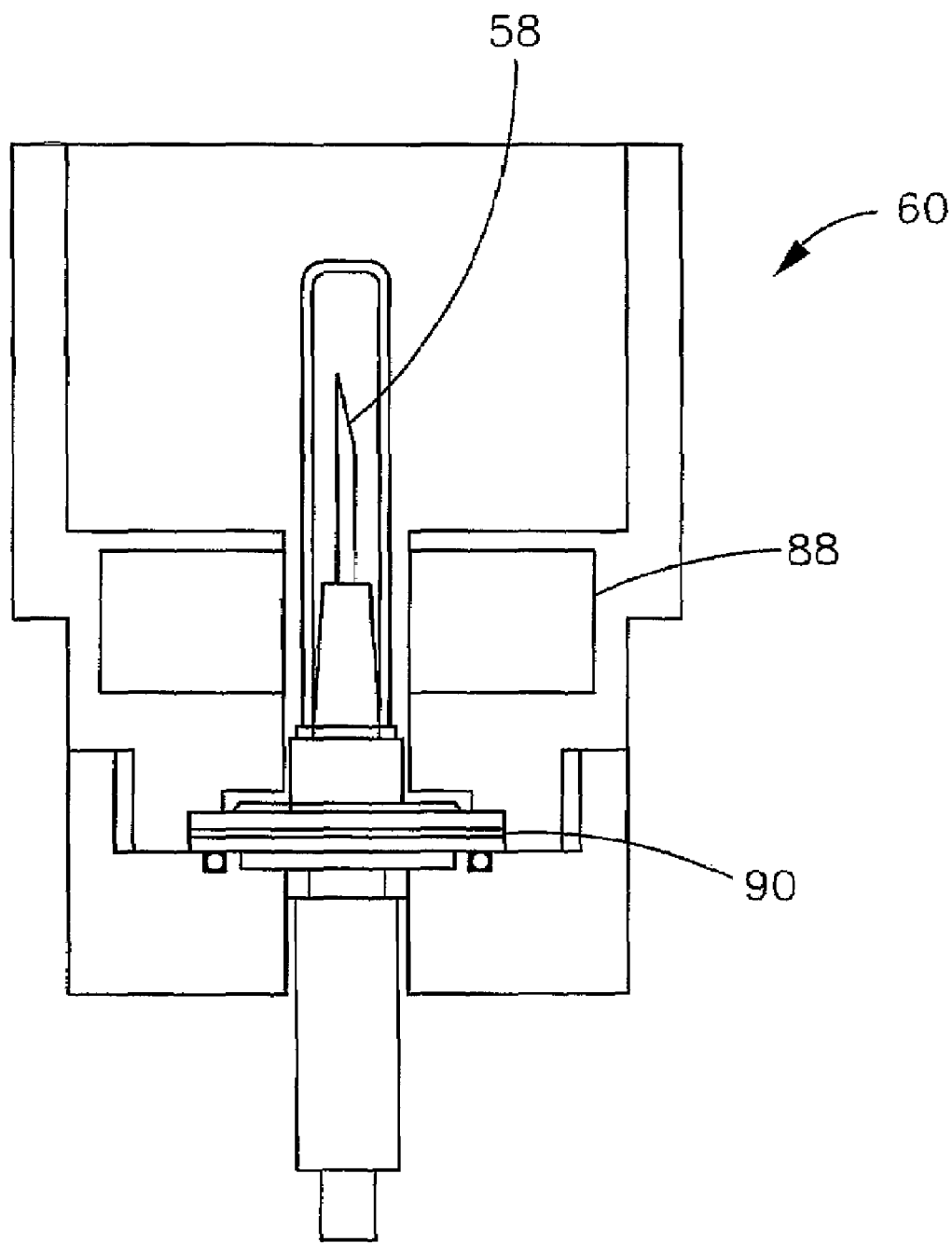
FIG. 2 is a cutaway side view depicting one shielded filter module according to the invention.

As shown in FIG. 2, a filter module 60 may be disposed external to the reactor housing 4 and may be in fluid communication with said exit port 24. The filter module 60 may include a radioactive shielding material insert 88 that is positioned between said collection vessel 84 and said reactor housing 4. The filter module 60 preferably holds a sterile 13 to 25 mm filter membrane 90 of 0.1 to 0.22 µm size, preferably of 0.2 µm size. The filter module 60 may be attached via a tread type adaptor to join the reactor to a sterile evacuated collection vessel 84. A changeable sterile needle 58 may be attached to the sterile filter 90 for daily sterile eluting procedures. The filter module 60 may abut a ridge of radioactive shielding material 34 and/or may abut a ridge of guide material 32 that is external to said reactor housing 4 and extends around said exit port 24. The filter module 60 may be at least partially contained within said ridge of radioactive shielding material 34 and/or said ridge of guide material 32. The radioactive shielding material may be lead, tungsten, or depleted uranium.

Figure 3:
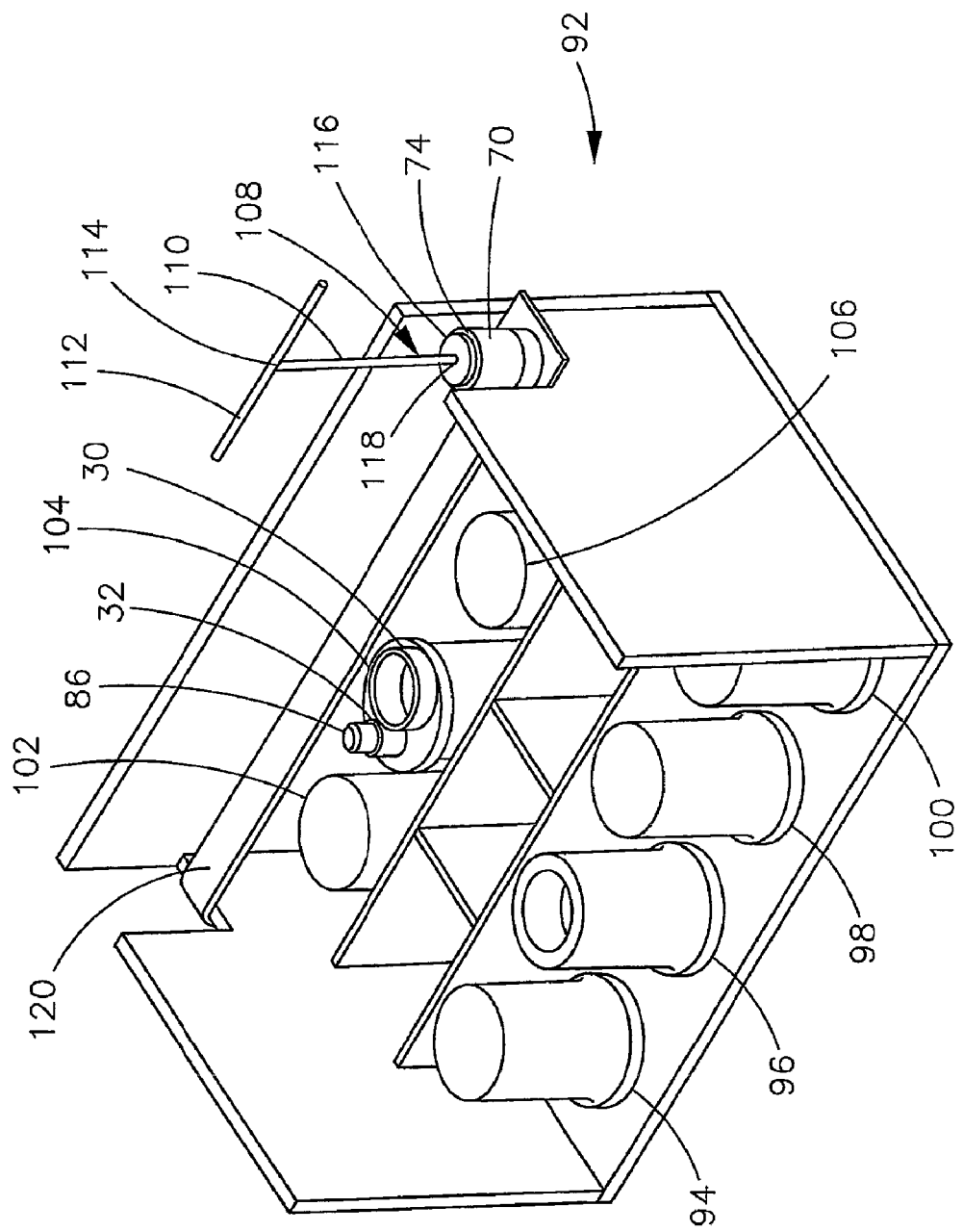
FIG. 3 is an isometric view of one cart according to the invention.

The generator system may include a cart 92, as shown in FIG. 3. The cart 92 preferably is fabricated from steel and lead. The frame is preferably fabricated from steel. The walls of cart 92 are preferably lead plates or lead brick. The cart 92 may hold a plurality of reactor housings 94, 96, 98, 100, 102, 104, and 106 that may be fabricated from radioactive shielding material The cart 92 may also comprise a plurality of delivery vessels 68 and/or a plurality of evacuated collection vessels 84 and/or a plurality of saline vessels 82. The cart 92 may include a transfer tool 108 that comprises a pick-up and release rod 110 having a handle 112 at a first end 114 thereof and a coupling 116 at a second end 118 thereof that is compatible with the first coupling 74 of said delivery housing 70. The transfer tool 108 preferably is a universal T-bar handle. The cart 92 may also include a conveyor belt 120, or other motion enhancing device, to assist a user with moving a delivery housing 70 proximate to a reactor housing (e.g., 94, 96, 98, 100, 102, 104, and 106).

Methods of radioisotope generation according to the invention may be described with reference to FIGS. 1 and 2. In certain embodiments, such methods involve positioning a first delivery vessel 68 comprising a solution of at least one radioisotope external to said reactor housing 4 and in fluid communication with said entry port 22 for a time and under conditions effective to elute said chromatographic column 18 with at least a portion of said solution. The first delivery vessel 68 may be positioned by mating said first coupling 74 at said first end 72 of said delivery housing 70 with transfer tool 108 and lifting the delivery housing 70. The coupling 78 at said second end 76 of said first delivery housing 70 may be mated with a coupling on said reactor housing 4 that is compatible with said coupling 78 at said second end 76 of said first delivery housing 70. The delivery vessel 68 may be removed from said position relative to said reactor housing 4 by lifting said delivery housing 70. Subsequent delivery vessels comprising saline solution or a solution of at least one radioisotope may be used to elute said column 18 with at least a portion of said solutions. A collection vessel 84 may be positioned external to said reactor housing 4 and in fluid communication with said exit port 22 via said filter module 60. The column 18, column assembly 20, filter module 60, filter membrane 90, sterile needle 58, delivery vessel 68, collection vessel 84 and/or saline vessel 82 may be removed from said reactor housing 10 and may be replaced by subsequent columns, column assemblies, filter modules, filter membranes, sterile needles, delivery vessels, collection vessels and/or saline vessels, respectively, as appropriate.

In certain embodiments, methods of radioisotope generation according to the invention involve the receipt of customer information including a target output of a radioisotope, the addition of a solution of a parent radioisotope to a delivery vessel in an amount sufficient to produce said target output upon decay of said parent radioisotope, and the shipment of said delivery vessel to said customer. The customer's generator system, in turn, may be loaded and re-loaded with varying volumes of said parent radioisotope effective to collect specific target concentrations of the desired radioisotope. The generator systems may be re-loaded more than 2 times, more preferably more than 4 times, and most preferably more than 6 times. Preferably, the customer information received includes a target output of Tc-99m from 1 to 50 Ci, and the solution added to the delivery vessel includes Mo-99 in an amount sufficient to produce said target output upon decay of said Mo-99.

In certain embodiments, methods of radioisotope generation according to the invention involve shipping to a customer a system that comprises a chromatographic column 18 that has been pre-loaded or otherwise bears at least one radioisotope (a "hot" column) and that is positioned within said internal volume 12 such that a first end 36 of said column 18 is in fluid communication with said entry port 22 and a second end 38 of said column 18 is in fluid communication with said exit port 24. A pre-loaded "hot" column is one that is eluted with at least one radioisotope prior to shipment to the customer. The shipment of a reactor comprising a "hot column" 18 to a customer eliminates the customer's burden of first loading the system before milking the generator and thereby "jump starts" the milking process, saving valuable time and resources.

In certain embodiments, methods of radioisotope generation according to the invention involve the receipt of customer information including a target output of a radioisotope, the loading of a chromatographic column 18 with a solution of a parent radioisotope in an amount sufficient to produce said target output upon decay of said parent radioisotope, and the shipment of said "hot column" or of said reactor comprising said hot column to said customer.

A kit for radioisotope generation according to the invention is also contemplated and may be described with reference to FIGS. 1-3. The kit may include a column 18 or a column assembly 20, a delivery housing 70 containing a delivery vessel 68 comprising at least one radioisotope, a filter module 60 comprising a radioactive shielding material insert 88, a transfer tool 108, a plurality of evacuated collection vessels 84 and a plurality of saline vessels 82. The kit can be used to replenish existing reactor housings 4 and thereby avoids shipment and disposal thereof. The kit may include a column 18 that has been pre-loaded with or otherwise bears at least one radioisotope (a "hot" column) or a column 18 that does not yet bear at least one radioisotope (a "cold" column).

In certain embodiments, methods of radioisotope generation according to the invention involve positioning a hot chromatographic column 18 in said reactor housing 4. A collection vessel 84 may be positioned external to said reactor housing 4 and in fluid communication with said exit port 22 via said filter module 60. A delivery vessel comprising saline solution may be used to elute said column 18 with at least a portion of said solution. Subsequent delivery vessels comprising saline solution or a solution of at least one radioisotope may be used to elute said column 18 with at least a portion of said solutions. The column 18, column assembly 20, filter module 60, filter membrane 90, sterile needle 58, delivery vessel 68, collection vessel 84 and/or saline vessel 82 may be removed from said reactor housing 10 and may be replaced by subsequent columns, column assemblies, filter modules, filter membranes, sterile needles, delivery vessels, collection vessels and/or saline vessels, respectively, as appropriate.

Figure 5:
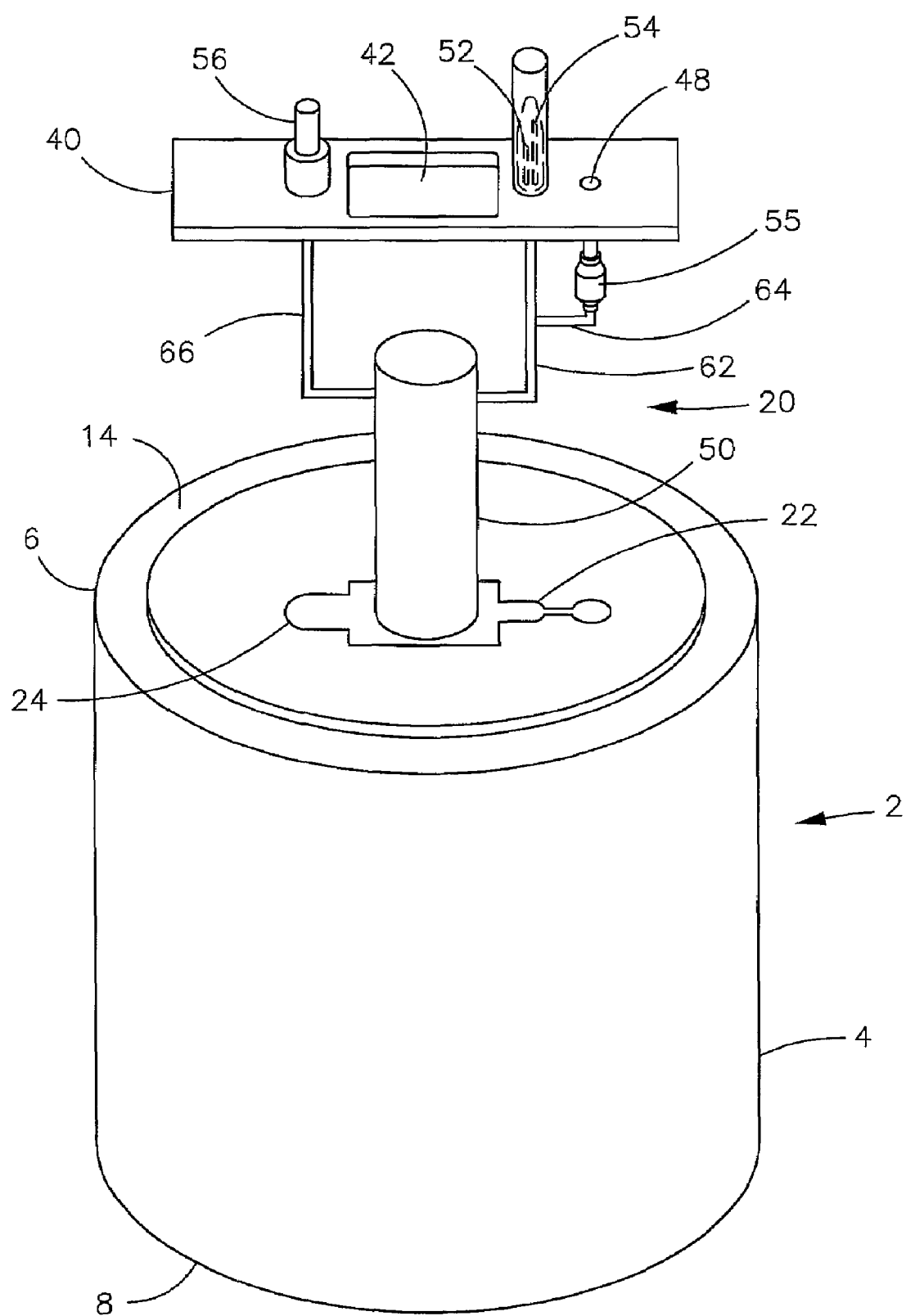
FIG. 5 is a perspective view of a column assembly being inserted into an internal volume of a reactor housing according to the invention.
Figure 6:
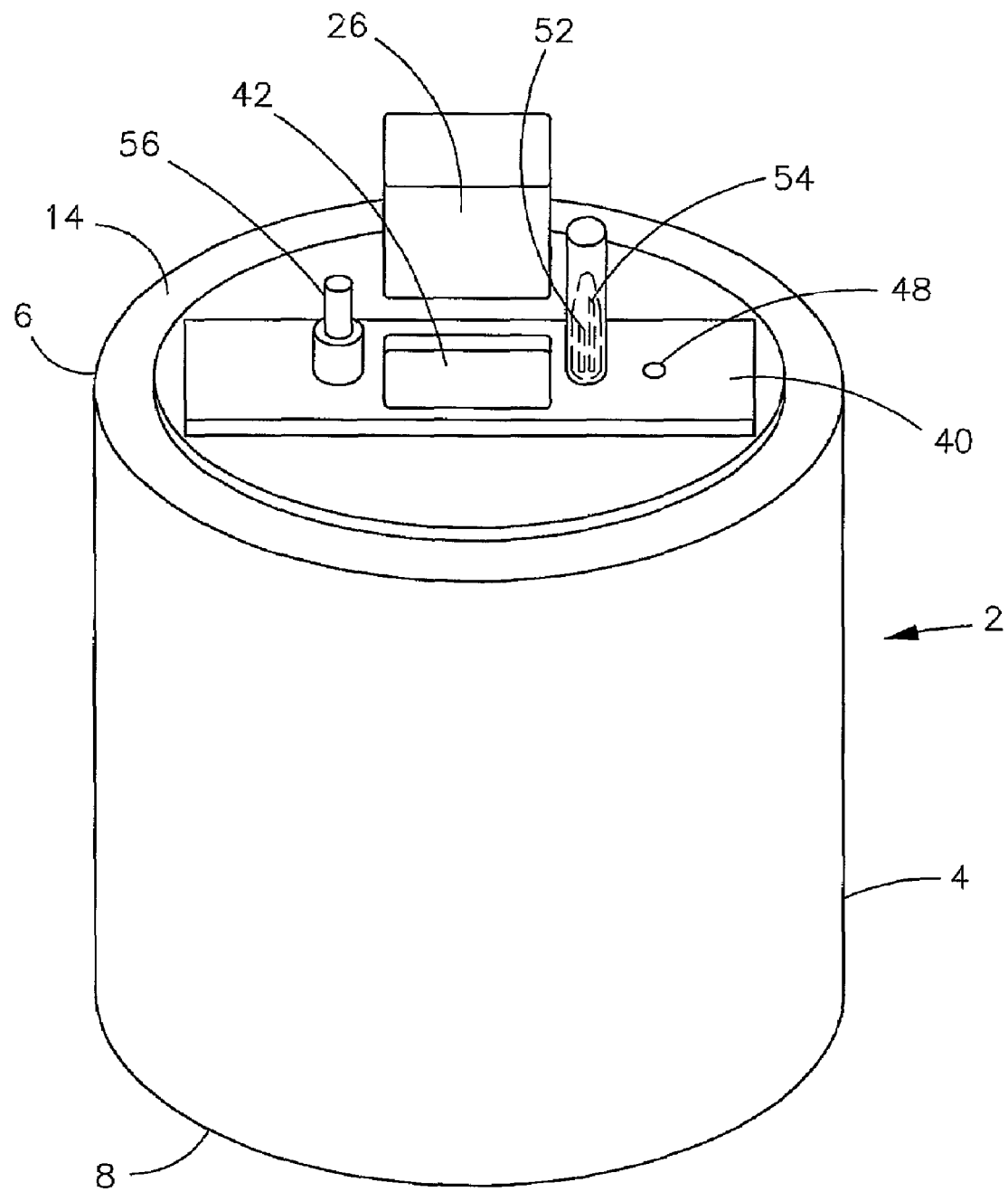
FIG. 6 is a perspective view of a radioactive shielding plug being inserted into an opening in a reactor housing according to the invention.
Figure 7:
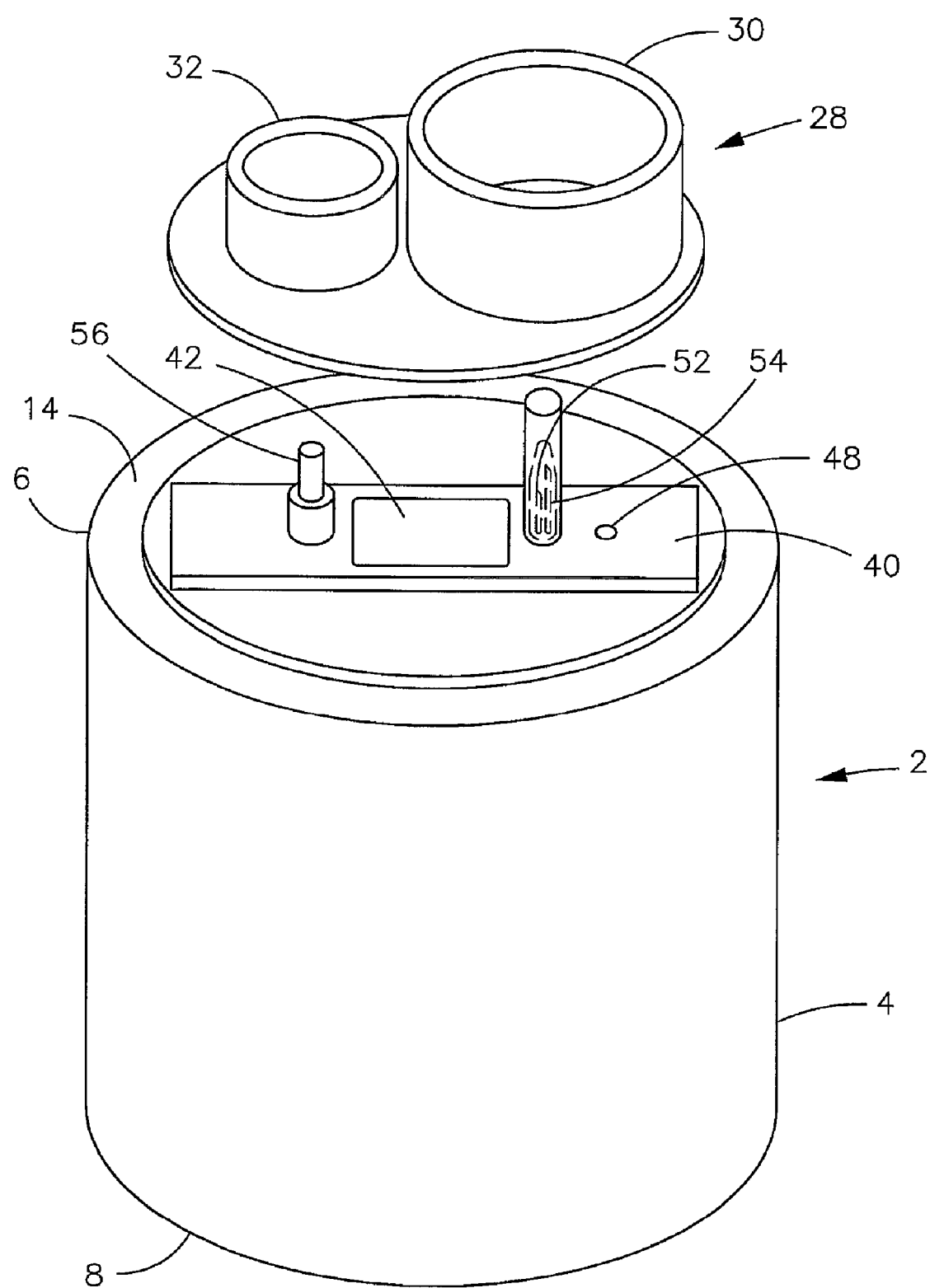
FIG. 7 is a perspective view of an adapter disk disposed on the surface of a reactor housing according to the invention.

In addition, exemplary steps for radioisotope generation according to the invention may be described with reference to FIGS. 1-7. As shown in FIG. 5, a column assembly 20 may be inserted into an internal volume 12 of a reactor housing 4 (said reactor housing having an entry port 22 and an exit port 24), through an opening 16 in the surface 14 of the reactor housing 4. Then, as shown in FIG. 6, the opening 16 above the column 18 may be plugged with a radioactive shielding plug 26. Then, as shown in FIG. 7, an adapter disk 28, comprising a ridge of guide material 30 extending around the entry port 22 and a ridge of guide material 32 extending around the exit port 24, may be disposed on the surface 14 of the reactor housing 4. A filter module 60 may then be disposed external to the reactor housing 4 in fluid communication with the exit port 24. A delivery vessel 68 containing a radioisotope, contained in a delivery housing 70, may then be disposed external to the reactor housing 4 and in fluid communication with the entry port 22. An evacuated collection vessel 84, contained with a collection housing 86, may then be disposed external to the reactor housing 4 in fluid communication with the exit port 24 via the filter module 60. After waiting a suitable amount of time (e.g., more than about three minutes), the collection vessel 84 and then the delivery vessel 68 may be removed. An adapter guide ridge 81 may then be disposed on the surface of the adapter disk 28 such that it extends around the entry port 22. A saline vessel 82 may then be disposed external to the reactor housing 4 and in fluid communication with the entry port 22. An evacuated collection vessel 84, contained within a collection housing 86, may then be disposed external to the reactor housing 4 and in fluid communication with the exit port 24 via the filter module 60. After again waiting a suitable amount of time, said collection housing 86 may be removed. An evacuated collection vessel 84, contained within a collection housing 86, may then be disposed external to the reactor housing 4 and in fluid communication with the exit port 24 via the filter module 60. The aforementioned exemplary steps may be repeated with subsequent delivery vessels, columns, filter modules and collection vessels as may be appropriate.

Thus, there have been described systems and methods for producing customized, predictable and reproducible supplies of radioisotopes that do not require weekly replacement, handling and transport of heavy shielding materials associated with conventional generators. It will be appreciated that numerous modifications may be made to the example embodiments described herein, and that such modifications do not depart from the scope of the invention as defined by the following claims.

What is claimed:

1. A system comprising:
   a reactor housing that is fabricated from a radioactive shielding material and has both an internal volume and a surface that comprises an entry port and an exit port;
   a chromatographic column that bears at least one radioisotope and is positioned within said internal volume;
   a filter module that is disposed external to said reactor housing and in fluid communication with said column;
   an adapter disk disposed on said reactor housing, comprising a ridge of material that extends around said entry port and a ridge of material that extends around said exit port, and,
   an adapter ridge disposed circumferentially internal to said ridge of material that extends around said entry port.

2. The system of claim 1 wherein said radioactive shielding material is lead, tungsten or depleted uranium.

3. The system of claim 1 wherein said reactor housing is substantially rectilinear.

4. The system of claim 1 wherein said reactor housing is substantially cylindrical.

5. The system of claim 1 wherein said reactor housing includes a first end, a second end, and a wall extending between said first end and said second end.

6. The system of claim 5 wherein said entry port and said exit port are positioned at said first end.

7. The system of claim 6 further comprising a ridge of radioactive shielding material extending around said entry port at said first end.

8. The system of claim 6 further comprising a ridge of radioactive shielding material extending around said exit port at said first end.

9. The system of claim 1 wherein said column comprises aluminum oxide particles from about 50 to about 200 μm in size.

10. The system of claim 1 wherein said column comprises silica gel particles from about 20 to about 100 μm in size.

11. The system of claim 1 wherein said column comprises one or more layers or polypropylene filter membranes, deactivated fused silica wool, one or more glass filter membranes from about 0.2 to about 10 μm in size and/or stainless steel tubing with needle and filter adaptors.

12. The system of claim 11 further comprising funnel drains.

13. The system of claim 1 wherein said filter module comprises a sterile 13 to 25 mm filter membrane from about 0.1 to about 0.22 μm size.

14. The system of claim 1 wherein said filter module is attached to said reactor vessel by a thread type adaptor.

15. The system of claim 14 wherein a needle is attached to said filter module.

16. The system of claim 1 wherein a collection housing is connected to said reactor housing via said filter module.

17. The system of claim 1 wherein said at least one radioisotope is Molybdate Mo-99.

18. The system of claim 1 wherein said at least one radioisotope is Pertechnetate Tc99m.

19. The system of claim 1 further comprising a delivery vessel that is disposed external to said reactor housing and in fluid communication with said column.

20. The system of claim 19 wherein said delivery vessel is contained within a delivery housing that is fabricated from radioactive shielding material.

21. The system of claim 20 wherein said delivery housing has a first end that includes a first coupling, a second end that includes a second coupling, and a wall extending between said first end and said second end.

22. The system of claim 21 wherein said first coupling is threaded.

23. The system of claim 21 further comprising a transfer tool that comprises a pick-up and release rod having a handle at a first end thereof and a coupling at a second end thereof that is compatible with said first coupling.

24. The system of claim 23 wherein said transfer tool is a T-bar handle.

25. The system of claim 19 wherein said delivery vessel comprises a solution of at least one radioisotope.

26. The system of claim 25 wherein said at least one radioisotope is Molybdate Mo-99.

27. The system of claim 25 wherein said solution is Sodium Molybdate Mo-99.

28. The system of claim 25 wherein said delivery vessel comprises about 1 to about 50 Ci.

29. The system of claim 19 wherein said delivery vessel comprises Normal Saline [0.9%] solution.

30. The system of claim 20 wherein said delivery housing abuts a ridge of material that is external to said reactor housing and extends around said entry port.

31. The system of claim 20 wherein said delivery housing is at least partially contained within a ridge of material that is external to said reactor housing and extends around said entry port.

32. The system of claim 19 wherein said delivery vessel is at least partially contained within a ridge of material that is external to said reactor housing and extends around said entry port.

33. The system of claim 1 further comprising a collection vessel that is disposed external to said reactor housing and in fluid communication with said column via said filter module.

34. The system of claim 1 wherein said collection vessel is evacuated.

35. The system of claim 1 wherein said collection vessel comprises a solution of at least one radioisotope.

36. The system of claim 35 wherein said at least one radioisotope is Technetium Tc99m.

37. The system of claim 35 wherein said solution is Sodium Pertechnetate Tc-99m.

38. The system of claim 1 further comprising a saline vessel that is disposed external to said reactor housing and in fluid communication with said column.

39. The system of claim 38 wherein said saline vessel comprises Normal Saline [0.9%] solution.

40. The system of claim 1 wherein said filter module abuts a ridge of radioactive shielding material that is external to said reactor housing and extends around said exit port.

41. The system of claim 1 wherein said filter module is at least partially contained within a ridge of radioactive shielding material that is external to said reactor housing and extends around said exit port.

42. The system of claim 1 wherein said collection vessel is contained within a collection housing that is fabricated from radioactive shielding material.

43. The system of claim 42 wherein said collection housing abuts a ridge of material that is external to said reactor housing and extends around said exit port.

44. The system of claim 42 wherein said collection housing is at least partially contained within a ridge of material that is external to said reactor housing and extends around said exit port.

45. The system of claim 1 further comprising a cart that includes a plurality of delivery vessels that each independently comprises a reactor vessel.

46. The system of claim 1 further comprising a cart that includes a plurality of delivery vessels that each independently comprise a solution of at least one radioisotope and are contained within a delivery housing that is fabricated from radioactive shielding material.

47. The system of claim 46 further comprising a conveyor belt for moving said delivery housing.

48. The system of claim 46 further comprising a transfer tool for moving said delivery housing.

49. The system of claim 46 wherein said at least one radioisotope is Molybdenum-99.

50. The system of claim 46 wherein said solution is Sodium Molybdate Mo 99.

51. The system of claim 46 wherein said delivery vessels each independently comprise about 1 to about 50 Ci.

52. The system of claim 1 further comprising a cart that includes a plurality of evacuated collection vessels.

53. The system of claim 1 further comprising a cart that includes a plurality of saline vessels.

54. The system according to claim 1 wherein said column is configured to be reloaded with radioisotope solution at least once.

55. The system according to claim 54 wherein said column is configured to be reloaded with radioisotope solution at least two times, at least four times, or at least six times.

56. The system according to claim 28 wherein said column is configured to be reloaded with radioisotope solution from a further delivery vessel at least once.

57. The system according to claim 56 wherein said column is configured to be reloaded with radioisotope solution from a further delivery vessel at least two times, at least four times, or at least six times.

58. The system according to claim 1 further comprising a column assembly comprising a further chromatographic column for replacing said chromatographic column after said at least some of said radioisotope has been eluted therefrom.

59. The system according to claim 58 wherein said further chromatographic column is configured to be reloaded with radioisotope solution one to six times.

60. The system according to claim 58 wherein said further chromatographic column is configured to be reloaded with radioisotope solution more than six times.

\* \* \* \* \*